(12) United States Patent
Xia et al.

(10) Patent No.: US 10,294,129 B2
(45) Date of Patent: *May 21, 2019

(54) POLYMERIC-METAL COMPOSITE ELECTRODE-BASED ELECTROCHEMICAL DEVICE FOR GENERATING OXIDANTS

(71) Applicant: GENERAL ELECTRIC COMPANY, Schenectady, NY (US)

(72) Inventors: Zijun Xia, Shanghai (CN); Caroline Chihyu Sui, Trevose, PA (US); Qunjian Huang, Shanghai (CN); Yida Xu, Shanghai (CN); Jeffrey I. Melzer, Trevose, PA (US); Wei Lu, Shanghai (CN); Xing Zhang, Shanghai (CN); Yanju Wang, Shanghai (CN); Xiaoan Xie, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 303 days.

This patent is subject to a terminal disclaimer.

(21) Appl. No.: 15/309,016

(22) PCT Filed: May 6, 2014

(86) PCT No.: PCT/US2014/036948
§ 371 (c)(1),
(2) Date: Nov. 4, 2016

(87) PCT Pub. No.: WO2015/088579
PCT Pub. Date: Jun. 18, 2015

(65) Prior Publication Data
US 2017/0073251 A1    Mar. 16, 2017

Related U.S. Application Data

(62) Division of application No. PCT/US2013/073797, filed on Dec. 9, 2013.

(51) Int. Cl.
*C02F 1/46* (2006.01)
*C02F 1/461* (2006.01)
(Continued)

(52) U.S. Cl.
CPC .......... *C02F 1/46109* (2013.01); *B01D 69/02* (2013.01); *B01D 69/10* (2013.01);
(Continued)

(58) Field of Classification Search
CPC ............... C02F 1/4674; C02F 1/46109; C02F 2201/46105; C02F 2303/04; C02F 1/467;
(Continued)

(56) References Cited

U.S. PATENT DOCUMENTS 4,066,519 A    1/1978  Kadija et al.
4,097,357 A    6/1978  Jacquelin
(Continued)

FOREIGN PATENT DOCUMENTS

CN    101713080 A    5/2010
EP    0376835 A1    7/1990
(Continued)

OTHER PUBLICATIONS

Kim et al., "Fabrication and Structural Characterization of Electrospun Polybenzimidazol-derived Carbon Nanofiber by Graphitization", Solid State Communications, Volume No. 132, Issue No. 8, pp. 567-571, Nov. 2004.
(Continued)

*Primary Examiner* — Walter D. Griffin
*Assistant Examiner* — Cameron J Allen
(74) *Attorney, Agent, or Firm* — Wegman, Hessler & Vanderburg

(57) ABSTRACT

A water treatment system comprises at least one electrolytic cell comprising at least one electrode and a power source for
(Continued)

powering the electrode. The electrode may be a metal electrode comprising a coating of polymer comprising structural units of formula I (I) wherein $R^1$ is independently at each occurrence a $C_1$-$C_6$ alkyl radical or —$SO_3M$ wherein M is independently at each occurrence a hydrogen or an alkali metal a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3. An associated method is also described.

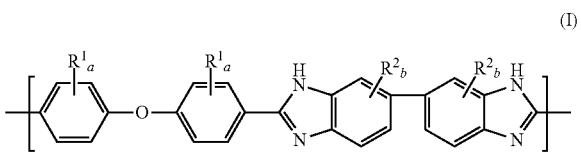

(I)

22 Claims, 5 Drawing Sheets

(51) Int. Cl.
| | |
|---|---|
| C25B 11/04 | (2006.01) |
| C25B 9/20 | (2006.01) |
| B01D 69/02 | (2006.01) |
| B01D 69/10 | (2006.01) |
| B01D 71/62 | (2006.01) |
| C02F 1/467 | (2006.01) |
| D01D 5/00 | (2006.01) |
| D04H 1/4326 | (2012.01) |
| D04H 1/728 | (2012.01) |

(52) U.S. Cl.
CPC ............. *B01D 71/62* (2013.01); *C02F 1/461* (2013.01); *C02F 1/4674* (2013.01); *C02F 1/4676* (2013.01); *C25B 9/203* (2013.01); *C25B 11/0405* (2013.01); *D01D 5/0007* (2013.01); *D04H 1/4326* (2013.01); *D04H 1/728* (2013.01); *B01D 2323/39* (2013.01); *B01D 2325/20* (2013.01); *C02F 2001/46138* (2013.01); *C02F 2001/46161* (2013.01); *C02F 2201/46115* (2013.01); *C02F 2303/04* (2013.01)

(58) Field of Classification Search
CPC .. C25B 11/0447; B01D 71/62; D01D 5/0007; D04H 1/728
See application file for complete search history.

(56) References Cited

U.S. PATENT DOCUMENTS

| 4,229,272 | A | 10/1980 | Yates |
| 4,722,773 | A | 2/1988 | Plowman et al. |
| 4,724,059 | A | 2/1988 | Collier |
| 5,071,532 | A | 12/1991 | Taillet et al. |
| 5,356,663 | A * | 10/1994 | Perusich .......... C08J 3/091 |
| | | | 210/500.27 |
| 5,419,816 | A | 5/1995 | Sampson et al. |
| 5,427,658 | A | 6/1995 | Allen |
| 5,525,436 | A * | 6/1996 | Savinell ......... B01D 67/0088 |
| | | | 204/252 |
| 5,879,522 | A * | 3/1999 | Shaaban ............ C25B 1/04 |
| | | | 204/263 |
| 6,409,895 | B1 | 6/2002 | Ponzano |
| 6,465,136 | B1 | 10/2002 | Fenton et al. |
| 6,485,851 | B1 | 11/2002 | Narayanan et al. |
| 6,814,840 | B2 | 11/2004 | Henuset et al. |
| 6,946,211 | B1 | 9/2005 | Bjerrum et al. |
| 7,144,652 | B2 | 12/2006 | Alberti et al. |
| 7,682,723 | B2 | 3/2010 | Melzner et al. |
| 7,846,374 | B2 | 12/2010 | Hovanec |
| 8,039,166 | B2 | 10/2011 | Fujibayashi |
| 8,241,542 | B2 | 8/2012 | Perry et al. |
| 2002/0001744 | A1 | 1/2002 | Tsusaka et al. |
| 2003/0042136 | A1 * | 3/2003 | Jovic .......... C25B 1/26 |
| | | | 204/294 |
| 2004/0028977 | A1 | 2/2004 | Pickup et al. |
| 2005/0181254 | A1 | 8/2005 | Uensal et al. |
| 2006/0014068 | A1 | 1/2006 | Boysen et al. |
| 2006/0099484 | A1 | 5/2006 | Karichev |
| 2006/0110653 | A1 | 5/2006 | Karichev et al. |
| 2006/0199062 | A1 | 9/2006 | Yanagita et al. |
| 2006/0210852 | A1 | 9/2006 | Datta et al. |
| 2007/0074975 | A1 | 4/2007 | Buschmann et al. |
| 2007/0087244 | A1 | 4/2007 | Melzner et al. |
| 2007/0092777 | A1 | 4/2007 | Zhamu et al. |
| 2007/0111075 | A1 | 5/2007 | Won et al. |
| 2007/0154778 | A1 | 7/2007 | Choi et al. |
| 2008/0063922 | A1 | 3/2008 | Jang et al. |
| 2008/0070777 | A1 | 3/2008 | Jang et al. |
| 2008/0096093 | A1 | 4/2008 | Jang et al. |
| 2008/0182153 | A1 | 7/2008 | Jang et al. |
| 2008/0193827 | A1 | 8/2008 | Jang et al. |
| 2008/0241612 | A1 | 10/2008 | Ballantine et al. |
| 2008/0264447 | A1 | 10/2008 | Eyal |
| 2009/0020734 | A1 | 1/2009 | Jang et al. |
| 2009/0098437 | A1 | 4/2009 | Choi et al. |
| 2010/0009267 | A1 | 1/2010 | Chase et al. |
| 2010/0015496 | A1 | 1/2010 | Miyake et al. |
| 2010/0035119 | A1 | 2/2010 | Wagner et al. |
| 2010/0239921 | A1 | 9/2010 | Fan |
| 2011/0143253 | A1 | 6/2011 | Miyata et al. |
| 2011/0168567 | A1 | 7/2011 | Smith et al. |
| 2012/0028154 | A1 | 2/2012 | Owejan et al. |
| 2012/0052403 | A1 | 3/2012 | Tatematsu |
| 2012/0100455 | A1 | 4/2012 | Uensal et al. |
| 2012/0177976 | A1 | 7/2012 | Wensley et al. |
| 2012/0321988 | A1 | 12/2012 | Sharman |

FOREIGN PATENT DOCUMENTS

| EP | 2172581 | A1 * | 4/2010 | ............... C23B 1/24 |
| EP | 2172581 | A1 | 4/2010 | |
| FR | 2704872 | A1 | 11/1994 | |
| GB | 2113718 | A | 8/1983 | |
| WO | 2004111803 | A2 | 12/2004 | |
| WO | 2007147689 | A1 | 12/2007 | |
| WO | 2008035092 | A1 | 3/2008 | |
| WO | 2011104542 | A1 | 9/2011 | |
| WO | 2011149732 | A2 | 12/2011 | |
| WO | 2011157811 | A1 | 12/2011 | |
| WO | 2012107738 | A1 | 8/2012 | |
| WO | 2012174463 | A1 | 12/2012 | |
| WO | 2013013241 | A2 | 1/2013 | |

OTHER PUBLICATIONS

Xu et al., "Synthesis of Novel Sulfonated Polybenzimidazole and Preparation of Cross-Linked Membranes for Fuel Cell Application", Polymer, Volume No. 48, Issue No. 19, pp. 5556-5564, Sep. 10, 2007.
Khan, "Electrospinning Polymer Nanofibers—Electrical and Optical Characterization", OhioLINK, Nov. 2007.
Choi et al., "Nafion-Impregnated Electrospun Polyvinylidene Fluoride Composite Membranes for Direct Methanol Fuel Cells", Journal of Power Sources, Elsevier SA, CH, Volume No. 180, Issue No. 1, pp. 167-171, May 15, 2008.
Graberg et al., "Electrospun Silica—Polybenzimidazole Nanocomposite Fibers", Macromolecular Materials and Engineering, vol. No. 293, Issue No. 10, pp. 815-819, Oct. 10, 2008.
Xu et al., "Synthesis of Novel Polybenzimidazoles with Pendant Amino Groups and the Formation of Their Crosslinked Membranes

(56) References Cited

OTHER PUBLICATIONS for Medium Temperature Fuel Cell Applications", Journal of Polymer Science Part A: Polymer Chemistry, Volume No. 47, Issue No. 24, pp. 6992-7002, Dec. 15, 2009.

Mazur et al., "Preparation of Gas Diffusion Electrodes for High Temperature PEM-type Fuel Cells", Desalination and Water Treatment, Volume No. 14, Issue No. 1-3, pp. 101-105, Feb. 2010.

Dai et al., "Properties of Polymer Electrolyte Membranes Based on Poly(Aryl Ether Benzimidazole) and Sulphonated Poly(Aryl Ether Benzimidazole) for High Temperature PEMFCs", Fuel Cells, Volume No. 10, Issue No. 5, pp. 754-761, Aug. 17, 2010.

Hui et al., "Progress of proton transfer mechanism in PEM", China Academic Journal Electronic Publishing House, vol. No. 34, Issue No. 11, pp. 1206-1209, Nov. 2010.

Teo et al., "Technological Advances in Electrospinning of Nanofibers", Sci. Technol. Adv. Mater., pp. 19, Volume No. 12, 2011.

Dai et al., "Ceramic Nanofibers Fabricated by Electrospinning and Their Applications in Ctalisis, Envireonmental Science, and Energy Technology", Polymer Advanced Technology, Volume No. 22, Issue No. 3, pp. 326-338, 2011.

Wang et al., "Novel Epoxy-based Cross-Linked Polybenzimidazole for High Temperature Proton Exchange Membrane Fuel Cells", International Journal of Hydrogen Energy, vol. No. 36, Issue No. 14, pp. 8412-8421, Jul. 2011.

Mazur et al., "Gas Diffusion Electrodes for High Temperature PEM-type Fuel Cells: Role of a Polymer Binder and Method of the Catalyst Layer Deposition", Journal of Applied Electrochemistry, Volume No. 41, Issue No. 9, pp. 1013-1019 Sep. 2011.

Lin et al., "Poly(Benzimidazole)-Epoxide Crosslink Membranes for High Temperature Proton Exchange Membrane Fuel Cells", International Journal of Hydrogen Energy, Volume No. 27, Issue No. 1, pp. 383-392, Jan. 2012.

Jung et al., "Manganese Oxide/Carbon Composite Nanofibers: Electrospinning Preparation and Application as a Fi-Functional Cathode for Rechargeable Lithium-Oxygen Batteries", J. Mater. Chem., Volume No. 22, pp. 21845-21848, 2012.

PCT Search Report and Written Opinion issued in connection with corresponding PCT Application No. PCT/US2013/073797 dated Feb. 28, 2014.

PCT Search Report and Written Opinion issued in connection with corresponding PCT Application No. PCT/US2013/073797 dated Aug. 12, 2014.

Unofficial English Translation of Chinese Office Action issued in connection with corresponding CN Application No. 201210559996.0 dated Jan. 30, 2015.

European Office Action issued in connection with corresponding EP Application No. 13812370.8 dated May 25, 2016.

\* cited by examiner

POLYMERIC-METAL COMPOSITE ELECTRODE-BASED ELECTROCHEMICAL DEVICE FOR GENERATING OXIDANTS

CROSS REFERENCE TO RELATED APPLICATION

This application is entitled to the benefit of PCT application PCT/US13/73797 filed on Dec. 9, 2013 and titled WATER TREATMENT SYSTEM AND METHOD, herein incorporated by reference.

FIELD OF THE INVENTION

This invention relates generally to water treatment systems and methods.

BACKGROUND

An article by Hongjie Xu et al., "Synthesis of novel sulfonated polybenzimidazole and preparation of cross-linked membranes for fuel cell application", *Polymer*, Volume 48, Issue 19, 10 Sep. 2007, pages 5556-5564, discloses that sulfonated poly[2,20-(p-oxydiphenylene)-5,50-bibenzimidazole] (SOPBI), prepared by post-sulfonation reaction of the parent polymer, poly[2,20-(p-oxydiphenylene)-5,50-bibenzimidazole] (OPBI), may be used in membranes for fuel cells. Fuel cells are devices that convert chemical energies from fuels into electricity through chemical reactions and membranes are individual components separate from electrodes of the fuel cells.

Differently, electrolytic cells are electrochemical cells in which energies from applied voltages are used to drive otherwise nonspontaneous reactions and, as is disclosed in the international patent application publication No. WO 2008/035092 A1, are sometimes used in water treatment systems and methods, for example, to produce hypochlorite, such as sodium hypochlorite and potassium hypochlorite, for controlling levels of microorganisms in water circulation systems.

Currently, there are two main types of electrochemical oxidant generators. In the first type, the anode and cathode are separated physically by plastic mesh and there is no ion exchange membrane. The oxidant generated at the anode has the possibility to contact cathode and be reduced again. This reduces the efficiency of the electrolytic cell.

The second type has an ion exchange membrane, usually with a cation exchange membrane made of a sulfonated tetrafluoroethylene based fluoropolymer-copolymer such as Nafion®. The membrane increases the resistance, and when the target product is hypochlorite, chlorine gas is produced in the anode chamber and the hydroxide ions are produced in the cathode chamber. The products in the anode and cathode chambers cannot react inside the cell but need be treated outside of the system. This increases the potential exposure to chlorine gas, which is highly toxic.

BRIEF DESCRIPTION

In the water treatment system and methods of the present invention, the oxidant generated at the anode cannot contact the cathode directly as the cathode is coated with a protective polymer. In some instances, this may result in the electrolytic cell operating more efficiently than in electrolytic cells where the cathode and anode are only separated by a plastic mesh. In addition, the electrolytic cell of the present invention may have a lower resistance than electrolytic cells comprising a membrane, since the metal electrode with the protective polymer coating form an integrated assembly. Without limiting the invention to one theory of operation, it is believed that the molecular structure of the polymer selectively only allows water, and the target ions (OH$^-$) to pass through to the cathode while blocking non-target ions (ClO$^-$) thereby avoiding the side reaction of product ClO$^-$ reducing back to Cl$^-$ at the cathode. This selectivity enhances the transfer target ions (OH$^-$), thereby increasing the efficiency of each cell resulting in a decrease in capital and operating expenditures.

Accordingly, in one aspect, a water treatment system may comprise at least one electrolytic cell comprising at least one electrode and a power source for powering the electrode. The electrode may be a metal electrode comprising a polymer coating comprising structural units of formula I

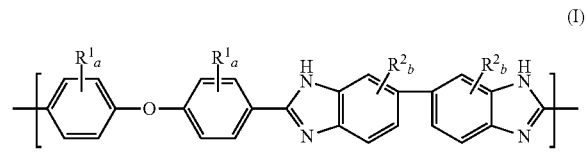

wherein $R^1$ is independently at each occurrence a $C_1$-$C_6$ alkyl radical or —SO$_3$M wherein M is a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3. In one embodiment, b may be 0. In another embodiment, a may be 0. In yet another embodiment, both a and b may be 0. Alternatively, b may be 0, a may be 1, and $R^1$ may be —SO$_3$M wherein M is a hydrogen or an alkali metal.

M may be independently at each occurrence a hydrogen or an alkali metal. Suitable alkali metals include, but are not limited to hydrogen, lithium, sodium or potassium. In one embodiment, M may be sodium.

In another embodiment, the metal electrode may comprise a metal selected from the group consisting of titanium, nickel, aluminum, molybdenum, niobium, tin, tungsten, zinc, and combinations thereof. In one embodiment, the metal electrode may comprise titanium. In yet another embodiment, the metal electrode may be a metal plate or a metal foam electrode.

In another embodiment, the polymer coating may comprise fibers formed using an electrospinning process. In yet another embodiment, the metal electrode may be a foam metal electrode coated with a polymer coating comprising fibers formed using an electrospinning process.

In another embodiment, the electrolytic cell may comprise at least two electrodes and a liquid chamber between the at least two electrodes. At least one of the electrodes may be a bipolar electrode. The electrolytic cell may have an input line and/or an output line in communication with the liquid chamber.

In another aspect a method is provided. The method may comprise passing an electric current through an aqueous solution of an electrolyte by passing the electric current through an electrode of an electrolytic cell. The electrode may be a metal substrate with at least one surface coated with a polymer coating comprising structural units of formula I

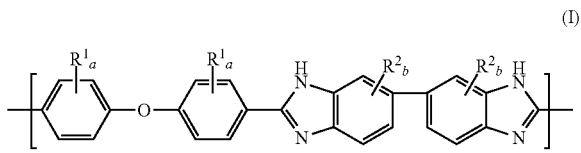

(I)

wherein $R^1$ is independently at each occurrence a $C_1$-$C_6$ alkyl radical or —$SO_3M$ wherein M is a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3. In one embodiment, b may be 0. In another embodiment, a may be 0. In yet another embodiment, both a and b may be 0. Alternatively, b may be 0, a may be 1, and $R^1$ may be —$SO_3M$ wherein M is a hydrogen or an alkali metal.

At least some water from the aqueous solution is allowed to permeate, or be passively transported, through the coating to the metal substrate. The water may be reduced upon contacting the metal substrate to produce hydrogen gas ($H_2$) and hydroxide ions ($OH^-$). The reaction products, hydrogen gas and hydroxide ions, may be passively transported back through the coating and away from the metal substrate. Thus, the hydroxide ions go back into the aqueous solution thereby contacting the cations in the aqueous solution and producing hypochlorite.

In one embodiment, the aqueous solution may be an alkali halide solution. In yet another embodiment, the aqueous solution may be a sodium chloride solution or a potassium chloride solution.

In another embodiment, the polymer coating may have the formula above wherein b is 0. In another embodiment, a may be 0. In yet another embodiment, both a and b may be 0. Alternatively, b may be 0, a may be 1, and $R^1$ may be —$SO_3M$ wherein M is a hydrogen or an alkali metal.

In another embodiment, the polymer may comprise structural units of formula I comprising structural units of formula:

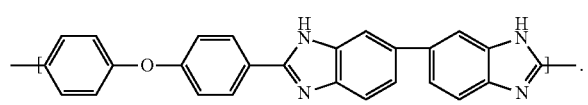

Alternatively, the polymer may comprise structural units of formula I comprising structural units of formula:

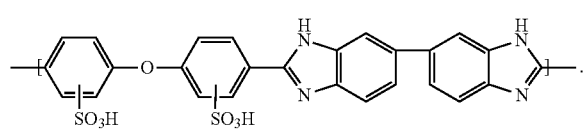

Alternatively, the polymer may comprise structural units of formula I comprising structural units of formula:

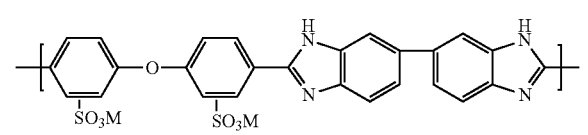

wherein M is a hydrogen or an alkali metal.

In another embodiment, the metal electrode may comprise a metal selected from the group consisting of titanium, nickel, aluminum, molybdenum, niobium, tin, tungsten, zinc, and combinations thereof. In another embodiment, the metal electrode may comprise titanium. In yet another embodiment, the metal electrode may be a metal plate or a metal foam electrode.

In another embodiment, the polymer coating may comprise fibers formed using an electrospinning process. In yet another embodiment, the metal electrode may be a foam metal electrode coated with a polymer coating comprising fibers formed using an electrospinning process.

The hypochlorite produced may be used to control or reduce the levels of microorganisms present in an aqueous stream. Accordingly, in another embodiment, the method may further comprise contacting an aqueous stream with the produced hypochlorite to reduce levels of microorganisms present in the aqueous stream.

BRIEF DESCRIPTION OF THE DRAWINGS

The above and other aspects, features, and advantages of the present disclosure will become more apparent in light of the following detailed description when taken in conjunction with the accompanying drawings.

DETAILED DESCRIPTION OF THE DISCLOSURE

Figure 1:
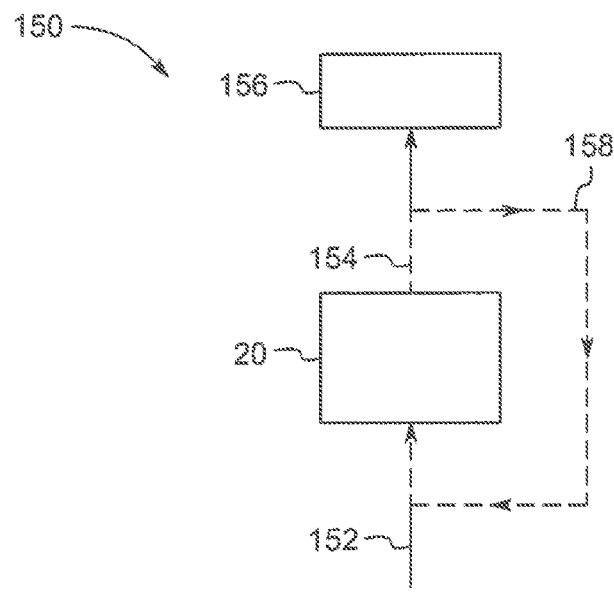
FIG. 1 is a schematic drawing of a water treatment system in accordance with one embodiment of the present invention.

Approximating language, as used herein throughout the specification and claims, may be applied to modify any quantitative representation that could permissibly vary, without resulting in a change in the basic function to which it is related. Accordingly, a value modified by a term or terms, such as "about", is not limited to the precise value specified. In some instances, the approximating language may correspond to the precision of an instrument for measuring the value.

In the following specification and claims, the singular forms "a", "an" and "the" include plural referents, unless the context clearly dictates otherwise. Moreover, the suffix "(s)" as used herein is usually intended to include both the singular and the plural of the term that it modifies, thereby including one or more of that term. The terms "first," "second," and the like, herein do not denote any order, quantity, or importance, but rather are used to distinguish one element from another or one embodiment from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable. For example, in some circumstances, an event or capacity may be expected, while in other circumstances, the event or capacity cannot occur. This distinction is captured by the terms "may" and "may be".

Any numerical values recited herein include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 600 to 1000, it is intended that values such as 600 to 850, 651 to 902, 700 to 851, 800 to 1000 etc. are expressly enumerated in this specification. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner.

Reference throughout the specification to "one embodiment," "another embodiment," "an embodiment," "some embodiments," and so forth, means that a particular element (e.g., feature, structure, and/or characteristic) described in connection with the invention is included in at least one embodiment described herein, and may or may not be present in other embodiments. In addition, it is to be understood that the described inventive features may be combined in any suitable manner in the various embodiments and configurations.

Preferred embodiments of the present disclosure will be described hereinbelow with reference to the accompanying drawings. In the following description, well-known functions or constructions are not described in detail to avoid obscuring the disclosure in unnecessary detail.

According to embodiments of the present invention, the water treatment system could be any water treatment system that controls levels of microorganisms in water. FIG. 1 illustrates a water treatment system 150 in accordance with one embodiment of the present invention. The water treatment system 150 comprises an electrolytic cell 20, an input line 152, an output line 154 and a downstream unit 156. An aqueous solution of an electrolyte is fed to the electrolytic cell 20 via input line 152. As the aqueous solution comprising the electrolyte containing the anions and cations passes through the electrolytic cell 20, the ions are converted to the desired electrochemical products (for example sodium hypochlorite and sodium chloride) within the aqueous solution. The aqueous solution with the desired electrochemical products exits the electrolytic cell 20 via output line 154 and enters downstream unit 156. The water treatment system 150 may also comprise a feed tank (not shown) for holding the aqueous electrolyte solution. The feed tank may be fluidly connected to the electrolytic cell 20 via input line 152.

Figure 2:
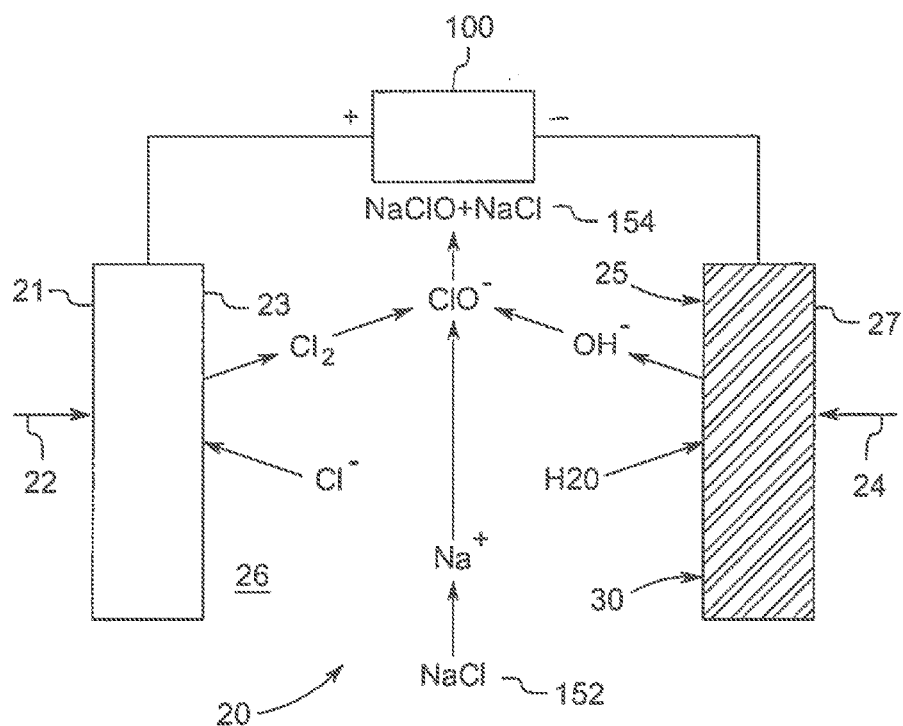
FIG. 2 is a schematic cross-sectional view of an embodiment of an electrolytic cell that may be used in the water treatment system of FIG. 1.

Turning now to FIG. 2, the electrolytic cell 20 comprises a first electrode 22, a second electrode 24 and a power source 100. In the illustrated embodiment, the electrolytic cell 20 comprises a liquid chamber 26.

The power source 100 may be a source of DC or AC electric current that flows through an electrolytic circuit. The liquid chamber 26 is positioned between the first electrode 22 and the second electrode 24 and is adapted to receive an aqueous solution of an electrolyte that contains anions and cations from the input line 152. For example, the aqueous solution is a sodium chloride solution that contains chloride anions and sodium cations or a potassium chloride solution that contains chloride anions and potassium cations. The ions within the aqueous solution transfer the electric current between the first electrode 22 and the second electrode 24 to complete the electrolytic circuit. The liquid chamber 26 does not require a selectively permeable membrane.

The first electrode 22 includes an electrode substrate composed of titanium or a titanium alloy. The first electrode 22 is generally planar in shape with a first side 21 and a second side 23. The first electrode 22 is in fluid communication with the liquid chamber 26. When the electrolytic circuit is complete, the first electrode oxidizes the anions, e.g. the chloride ions from the sodium chloride solution, to produce oxidation products, chloride gas, and electrons:

$$2Cl^- \rightarrow Cl_2 + 2e^- \quad (1).$$

The second electrode 24 is generally planar, with a first surface 25 and a second surface 27. The second electrode 24 is in fluid communication with the liquid chamber 26. The second electrode, 24 may be a cathode. The reactive part of the second electrode 24 is a metal. The metal may be any suitable metal, including, but not limited to, titanium, nickel, aluminum, molybdenum, niobium, tin, tungsten, zinc, and combinations thereof. In yet another embodiment, the metal cathode may be a metal foam substrate with a high surface area.

The second electrode 24 has a polymer coating 30 on at least one surface that is water permeable to allow water from the liquid chamber 26 to permeate to the metal substrate where hydroxide ions are formed:

$$2H_2O + 2e^- \rightarrow H_2 + 2OH^- \quad (2).$$

The hydroxide ions (and hydrogen gas) produced by the reaction move from the second electrode 24 to the liquid chamber 26 back through the polymer coating 30.

In another embodiment, the entire electrode 24 may be covered in the polymer coating 30 such that both the first surface 25 and the second surface 27 have a polymer coating 30.

The polymer coating may comprise a polymer comprising structural units of formula I

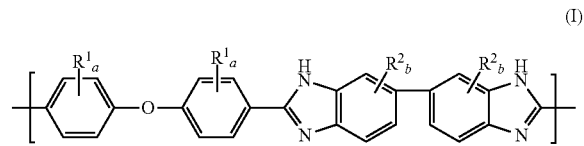

wherein $R^1$ is independently at each occurrence a $C_1$-$C_6$ alkyl radical or —$SO_3M$ wherein M is a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3.

In some embodiments, b=0, a=0 and the polymer comprising structural units of formula I is poly[2,20-(p-oxydiphenylene)-5,50-bibenzimidazole] (OPBI) prepared, in some embodiments, by the condensation of diamine and benzoic acid derivatives in the presence of a catalyst and a solvent with heating. Examples of the catalyst include, but are not limited to, $P_2O_5$, polyphosphoric acids, and concentrated sulfuric acid. Examples of the solvent include, but are not limited to, methanesulfonic acid, trifluoromethanesulfonic acid, 4-(trifluoromethyl)benzenesulfonic acid, dimethyl sulfur oxide, dimethylamide acetate, dimethyl formamide. The heating temperature may be in a range of from about 50° C. to about 300° C., preferred of from about 120° C. to about 180° C.

In some embodiments, b=0, a=1, $R^1$ is —$SO_3H$, and the polymer comprising structural units of formula I is sulfonated poly[2,20-(p-oxydiphenylene)-5,50-bibenzimidazole] (SOPBI) prepared by the post-sulfonation reaction of the OPBI polymer, using concentrated and fuming sulfuric acid as the sulfonating reagent at a temperature in a range of from about 25° C. to about 200° C., and preferred in a range of from about 50° C. to about 100° C. The degree of sulfonation is not limited and may be as high as 100% by adjusting the reaction conditions.

According to embodiments of the present invention, the polymer comprising structural units of formula I is coated on the metal substrate of the second electrode 24. The coating 30 may be formed through the following steps: mixing a solution of the polymer comprising structural units of formula I, e.g., in any one or more of dimethyl sulphoxide (DMSO), N-methylpyrrolidone (NMP), dimethylformamide (DMF), and dimethylacetamide (DMAc), with a solution of sodium hydroxide, e.g., in one or more of ethanol, methanol, and isopropyl alcohol, to prepare a coating solution. The coating solution or polymer coating may be applied to the electrode using a variety of methods. These methods include, but are not limited to, "painting" the solution onto the electrode, immersing the electrode in the solution, forming a membrane from the solution and hot pressing the membrane to the electrode, and electrospinning the solution to fiber-coat the electrode. In some embodiments, the second electrode 24 may then be put in a vacuum and dried. The coating solution may be filtered through a polytetrafluoroethylene (PTFE) filter and degassed under a reduced pressure before being applied to the second electrode 24. In some embodiments, the second electrode 24 may be washed using water after drying to remove the residual solvent, if any.

In some embodiments, the second electrode 24 may be immersed in a solution of the SOPBI polymer and a suitable crosslinking agent such as Eaton's reagent (phosphorus pentoxide solution in methanesulfonic acid in the weight ratio of 1:10) at about 50~150° C. for 10~60 minutes to be coated with crosslinked SOPBI polymer with a better mechanical strength and a smaller swelling ratio. Alternatively, the second electrode 24 may be immersed at about 80° C. for about 60 minutes.

The second electrode may be a metal electrode comprising titanium, nickel, aluminum, molybdenum, niobium, tin, tungsten, zinc, or combinations thereof. The metal electrode may be a metal plate or a metal foam electrode. The metal plate electrode as used herein means an electrode made of metal that is substantially free of pores. The metal foam as used herein is a cellular structure made from solid metal containing a large volume fraction of gas-filled pores. Such foams typically have a very high porosity, and consequently a high surface area. Any pore size may be used in accordance with the present invention, however, without limiting this specification to one theory, it is believed that pore sizes having at least 100 microns will facilitate release of the $OH^-$ ions and $H_2$ gas generated at the cathode. Pore sizes less than 100 μm may result in insufficient release of generated $H_2$ gas from the electrode that will delaminate the polymer coating from the metal electrode. Thus, in some applications, the physical stability of the polymer coated electrode may be increased by increasing the pore size of the foam metal substrate. Accordingly, in one embodiment, the metal foam electrode may have an average pore size ranging from about 100 μm to about 1,000 μm. In another embodiment, the average pore size may range from about 100 μm to about 500 μm. In yet another embodiment, the average pore size may range from about 300 μm to about 500 μm.

When the polymer coating comprises fibers formed using an electrospinning process, however, the metal electrode may be a metal plate electrode. When made with electrospun fibers, the polymer coating is highly porous with a high surface area, producing a similar effect to using a metal foam electrode, namely enhancing the transfer of $OH^-$ while blocking $ClO^-$ and facilitating the release of generated $H_2$ gas. Thus, in some embodiments, the metal electrode may be a metal plate electrode wherein at least one surface is coated with a polymer coating comprising fibers formed using an electrospinning process. In yet another embodiment, the metal electrode may be a metal foam electrode wherein at least one surface is coated with a polymer coating comprising fibers formed using an electrospinning process.

The coating 30 transports hydroxide ions (and hydrogen gas) away from the metal substrate of the second electrode 24 and into the liquid chamber 26 while at the same time blocking hypochlorite ions from contacting the metal substrate. Within the liquid chamber 26, when a sodium chloride electrolyte aqueous solution is used, a reaction happens as:

$$Cl_2 + 2NaOH \rightarrow NaClO + NaCl + H_2O \quad (3).$$

This reaction produces sodium hypochlorite and a sodium chloride solution.

In some embodiments, the second side 23 is very close to the surface of the coating 30 on the first surface 25 making the dimensions of the liquid chamber 26 very small. This small liquid chamber 26 is large enough to permit the flow of fluids into, and the reaction products out of, the electrolytic cell 20. This optional feature may improve the efficiency of the reaction (3) from above.

In some embodiments, the system may comprise a water softening treatment step (not shown) of the aqueous solution prior to introduction into the liquid chamber 26. The water softening reduces or removes water hardness ions such as calcium, magnesium, potassium, strontium, and barium. The water softening treatment prevents the reaction of the carbon dioxide with the water hardness ions which can lead to the formation of undesirable carbonate ions and salts within the system causing precipitates that can scale, cover and insulate the electrodes.

Carbonate ions and salts may also decrease the rate of gas diffusion, which impairs the efficiency of the second electrode 24. Further, carbonate ions may impair or compete with the transport of hydroxide ions by the coating 30.

In some embodiments, a metal oxide catalyst coating (not shown) is coated on at least one side of the first electrode 22 that communicates with the liquid chamber 26. The metal oxide catalyst coating may be ruthenium oxide, iridium oxide and the like. The metal oxide catalyst coating increases the efficiency of the oxidation of the chlorine ions to produce chlorine gas and electrons, see equation (1) above.

In operation, an electrolyte fluid, for example sodium chloride solution, is introduced through the input line 152 into the liquid chamber 26 between the first electrode 22 and the second electrode 24. The presence of sodium ions and chloride ions allows the electric circuit to be completed between the first electrode 22 and the second electrode 24. The complete electric circuit provides a flow of electrons to drive the oxidation reaction to produce oxidation products at the first electrode 22. For example, see equation (1). The flow of electrons also drives the reduction reaction to produce reduction products at the second electrode 24, for example, see equation (2). The coating 30 of the second electrode 24 transports the hydroxide ions out of the second electrode 24 to react with the chlorine gas to produce sodium hypochlorite within the liquid chamber 26 as in equation (3).

In some embodiments, at least two electrolytic cells 20 may be placed in series so that the aqueous solution flows from one electrolytic cell 20 to the next. This series arrangement can increase the production of hypochlorite. In some embodiments, the electrolytic cell may include a spacer (not shown) between the first and the second electrodes 22, 24 and a pair of end plates (not shown) that enclose the electrodes 22, 24 and the spacer.

Figure 3:
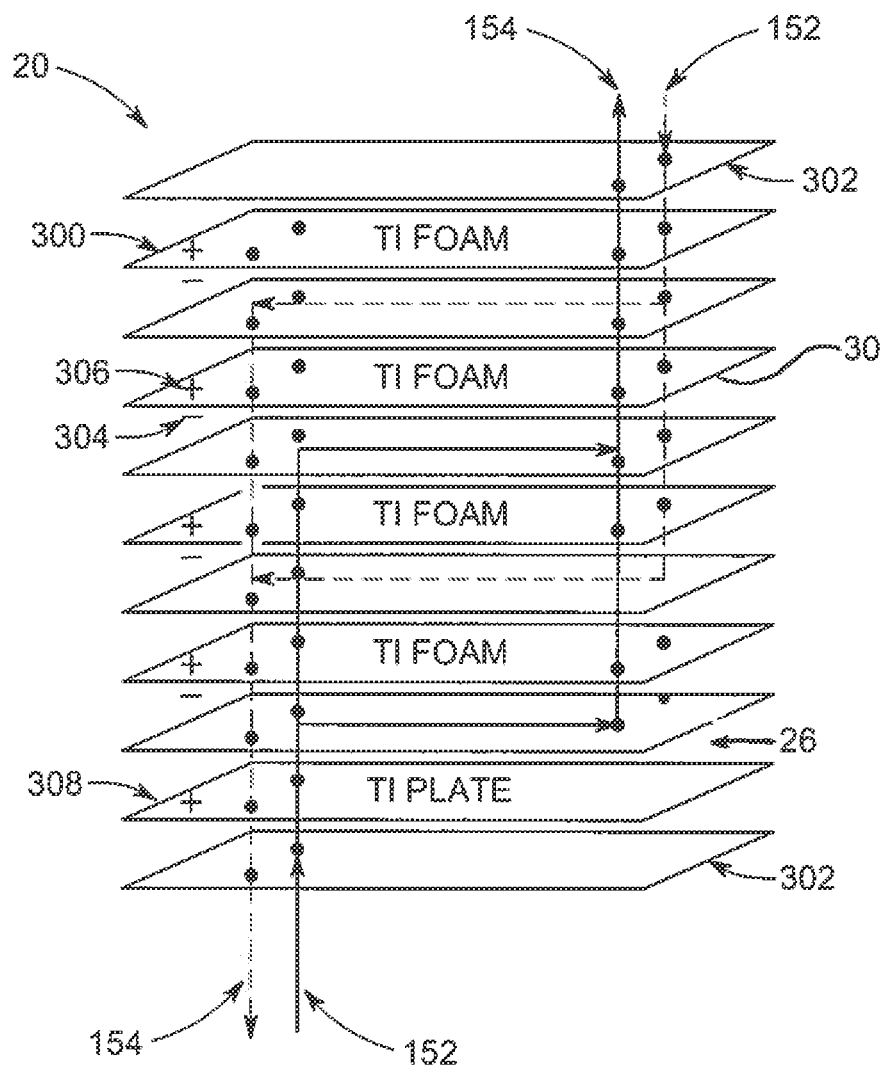
FIG. 3 is a schematic with an exploded view of an embodiment of an electrolytic cell that may be used in the water treatment system of FIG. 1.

As shown in FIG. 3, in some embodiments, the electrolytic cell 20 may be a bipolar electrolytic cell with a stacked design. The stacked cell may include spacers (not shown) to form a plurality of liquid chambers 26 between a plurality of bipolar electrodes 300 enclosed by a pair of endplates 302. The bipolar electrodes may have an anode side (+) 306 and a cathode side (−) 304. The cathode side 304 is coated with the polymer coating 30. The plurality of bipolar electrodes may be arranged such that the cathode side 304 of one bipolar electrode is on the opposite side of one of the liquid chambers 26 and facing the anode side 306 of an adjacent bipolar electrode. When a plurality of anodes and cathodes are present, the alternating arrangement may begin and end with an anode to ensure optimum activity of the cathodes at the start and end of the series. In other words, the electrode closest to either endplate 300 is an anode. In yet another embodiment, at least one of the anodes closest to the endplate 300 is a metal substrate anode 308 that is free of any polymer coating 30. The metal substrate anode 308 may be a porous metal substrate as described above, or it may be a non-porous metal substrate.

In another embodiment, the anode side 306 may comprise a metal oxide catalyst coating (not shown) as described above.

The aqueous solution of an electrolyte may be fed to the electrolytic cell 20 via input lines 152. As the aqueous solution comprising the electrolyte containing the anions and cations passes through the electrolytic cell 20, the ions are converted to the desired electrochemical products (for example sodium hypochlorite and sodium chloride) within the aqueous solution. The aqueous solution with the desired electrochemical products exits the electrolytic cell 20 via output lines 154.

The output line 154 conducts the electrochemical products (for example sodium hypochlorite and sodium chloride) away from the liquid chamber 26 to the downstream unit 156. The water treatment system 150 may be physically located close enough to the target water circulation system that the output line 154 can conduct hypochlorite directly into the target water circulation system, shown as the downstream unit 156 in FIG. 1 so that hypochlorite may control the level of microorganisms in the target water circulation system.

Alternatively, the downstream unit 156 may include a storage vessel (not shown) where the electrochemical products are stored for introduction into the target water circulation system as needed, for example, if the electrolytic cell 20 production exceeds the demands of the target water circulation system.

Optionally, the water treatment system 150 is located at a different physical location than the target water circulation system. In this option, the downstream unit 156 is a storage vessel to store hypochlorite products for transport to the target water circulation system.

In some embodiments, a recirculation line 158 (shown as the dotted lines in FIG. 1) is included the water treatment system 150 to recirculate at least a portion of the electrochemical products back into the input line 152 or directly into the electrolytic cell 20. In this optional feature the recirculation line 158 may include a pumping system (not shown) and possibly a secondary storage vessel (not shown).

As can be seen from the following examples, the electrolytic cell and the method according to embodiments of the present invention significantly increase the productivity of sodium hypochlorite. In addition, without being bound by theory, since the coating 30 is a part of the second electrode 24, the resistance of the electrolytic cell 20 is lower than a similar electrolytic cell that includes a membrane as an individual component separate from the electrodes. In this manner, the working potential requirements and the energy consumption of the electrolytic cell 20 are also lower than the similar electrolytic cell with a membrane. Therefore, an improved water treatment system and an associated method are provided.

EXAMPLES

The following example is included to provide additional guidance to those of ordinary skill in the art in practicing the claimed invention. These examples do not limit the invention as defined in the appended claims.

Example 1—Producing the OPBI Polymer

Monomer A (4,4'-dicarboxydiphenyl ether) and B (3,3',4,4'-biphenyltetramine) were added at a molar ratio of 1:1 into a three neck flask equipped with a refluxing condenser, a mechanical stirring bar and a nitrogen purging set. A mixture of $CF_3SO_3H$ and $P_2O_5$ at a weight ratio of 10:1 was added into the flask to make a solution in which $(A+B)/CF_3SO_3H \times 100\%$ was 10 wt %. The solution was then heated to 140° C. under N2 atmosphere for 120-180 minutes. A product (OPBI polymer) was obtained by pouring the reaction product into water, and washing in a $Na_2CO_3$ aquatic solution till the pH was neutral. The H NMR data of the OPBI polymer in DMSO were: 7.2-7.4 (brs, 2H), 7.4-8 (br, 3H), 8.2-8.4 (brs, 2H), 13 (brs, 1H).

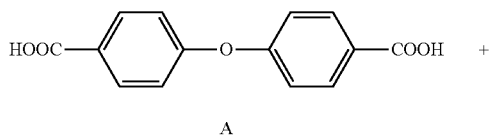

A

-continued

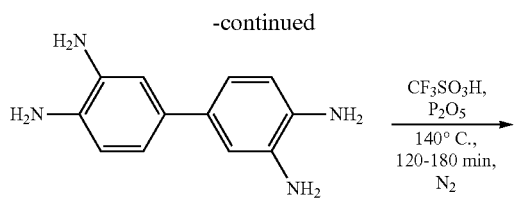

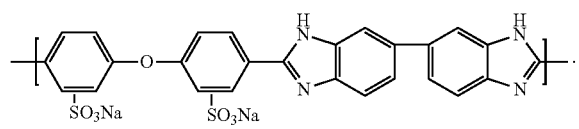

Example 2—Producing the Sulfonated OPBI (SOPBI) Polymer

The OPBI polymer obtained in example 1 was submerged into 30% fuming sulfuric acid at 80° C. for 120-180 minutes under mechanical stirring to get the sulfonated OPBI (SOPBI) polymer.

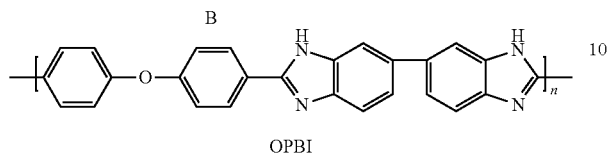

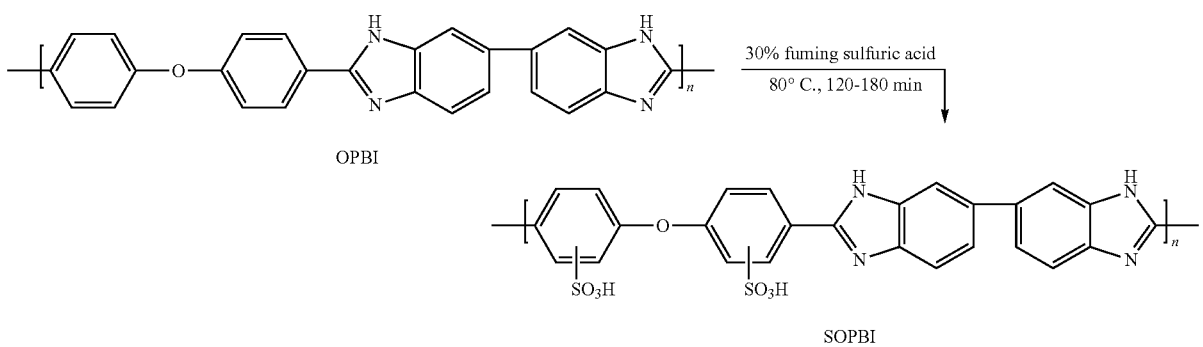

The SOPBI polymer may then be washed in a basic solution comprising an alkali metal to convert at least some of the polymer to its salt form. Suitable basic solutions include, but are not limited to $Na_2CO_3$ or $NaHCO_3$ or NaOH. LiOH, and KOH aquatic solutions. The resulting product will have the formula:

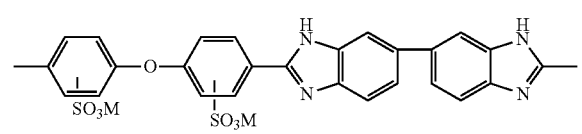

wherein M is a hydrogen or an alkali metal, such as Na, Li, or K.

In the present example, a product (SOPBI polymer) was obtained by pouring the reaction product into water, and washing in a $Na_2CO_3$ aqueous solution till the pH was neutral. The H NMR data of the SOPBI polymer in DMSO were: 7-7.2 (brs), 7.2-8 (br), 8.2-8.4 (brs), 8.7-8.8 (brs), 13 (brs). At least a portion of the SOPBI polymer produced is believed to have the formula:

Example 3—Coating Electrodes with the OPBI Polymer

A solution comprising 0.45 g NaOH in 5 mL ethanol was added into a mixture of 2.5 g of the OPBI polymer and 30 mL DMSO, stirred with a magnetic stirring bar at 60° C. until the OPBI polymer was fully dissolved. The resulting solution was filtered through a 0.5 μm PTFE film and the filtrate was degassed under a reduced pressure.

The filtrate was applied to three different titanium foam electrodes (4 cm×10 cm) as follows. For Electrode A, the titanium foam electrode was immersed in a container with the filtrate to coat the electrode with the filtrate. The electrode was removed from the container and heated at 80° C. for one hour to crosslink the filtrate thereby forming the polymer coating on the electrode. The average pore size for the electrodes was 300 μm.

For Electrode B, some of the filtrate was cross-linked into a polymer membrane. The polymer membrane was then hot pressed to a titanium foam electrode thereby forming a polymer coating on the electrode.

For Electrode C, the polymer coating was applied using an electrospinning process. The filtrate comprising the dissolved OPBI polymer was made into a solution comprising about 2 wt %-10 wt % of the OPBI polymer. The solution was added to the spinneret of an electrospinning apparatus. The solution was then extruded from the spinneret under a strong electric field (approximately 10-20 kV) to coat the titanium electrode. The electrode what then heat-treated in an argon atmosphere at 80° C. thereby forming a polymer coating on the electrode.

After drying, electrodes A, B, and C were immersed in deionized water at room temperature three times for a total period of time of 2 hours to remove any residual solvent.

Example 4—Testing the Polymer Coated Electrodes

Figure 4:
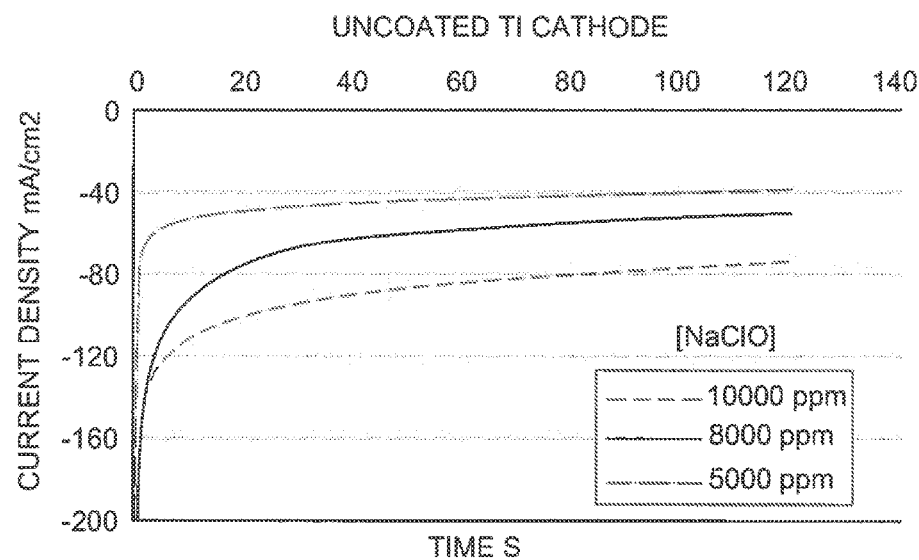
FIG. 4 shows the current density of an uncoated Ti cathode (control).
Figure 5:
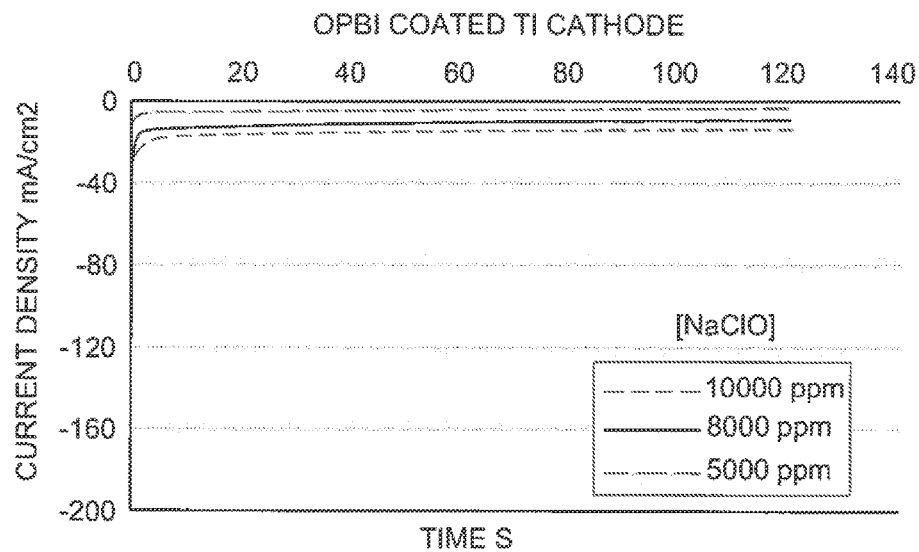
FIG. 5 shows the current density of an OPBI coated Ti cathode (Electrode A).
Figure 6:
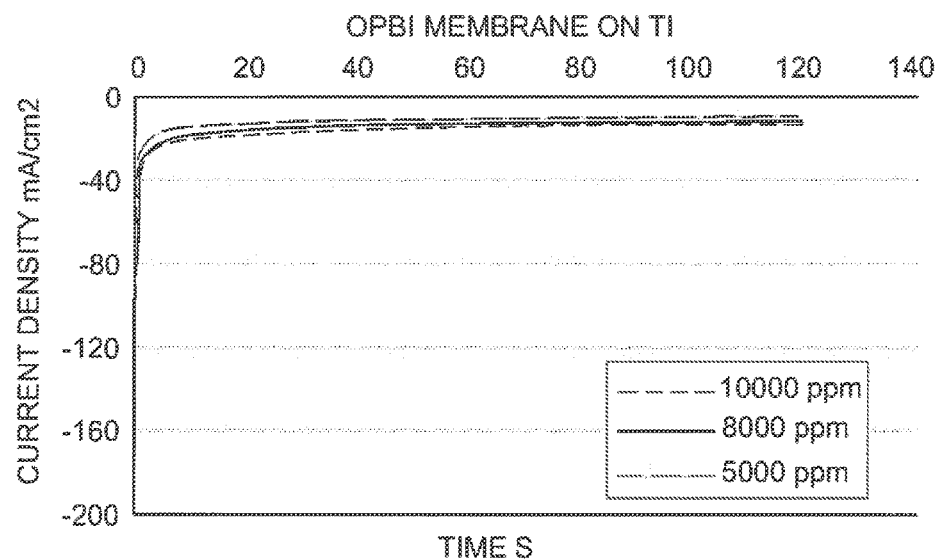
FIG. 6 shows the current density of an OPBI-membrane coated Ti cathode (Electrode B).
Figure 7:
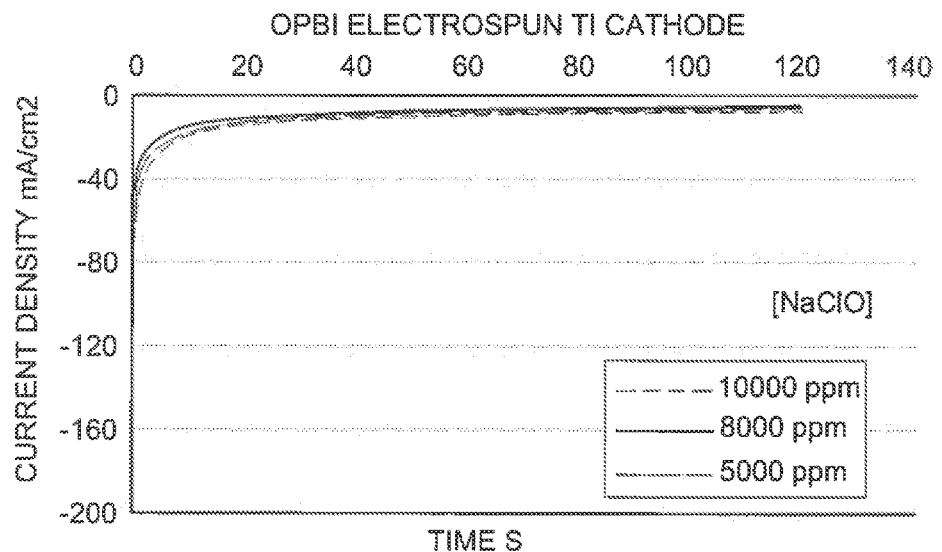
FIG. 7 shows the current density of an OPBI-fiber coated Ti cathode (Electrode C).

The polymer coated electrodes from Example 3 and one uncoated Ti foam electrode (control) were used to form four different electrolytic cells. Each cell performance was tested in the lab to compare their performance. First, the cell performance was tested at varying NaClO concentrations while maintaining a constant voltage. The NaClO concentrations were 5,000 ppm, 8,000 ppm and 10,000 ppm by volume (mg/l). FIG. 4 shows the current density (mA/cm²) of the uncoated foam electrode (control) with respect to time (s). FIG. 5 shows the current density of the OPBI coated cathode (Electrode A). FIG. 6 shows the current density of the OPBI-membrane coated cathode (Electrode B). FIG. 7 shows the current density of the OPBI-fiber coated cathode (Electrode C). Comparing FIGS. 4-7, the current density of the polymer-coated electrodes remained relatively constant at different NaClO concentrations, while for the uncoated electrode, there was a marked difference in current density at the different NaClO concentrations.

Figure 8:
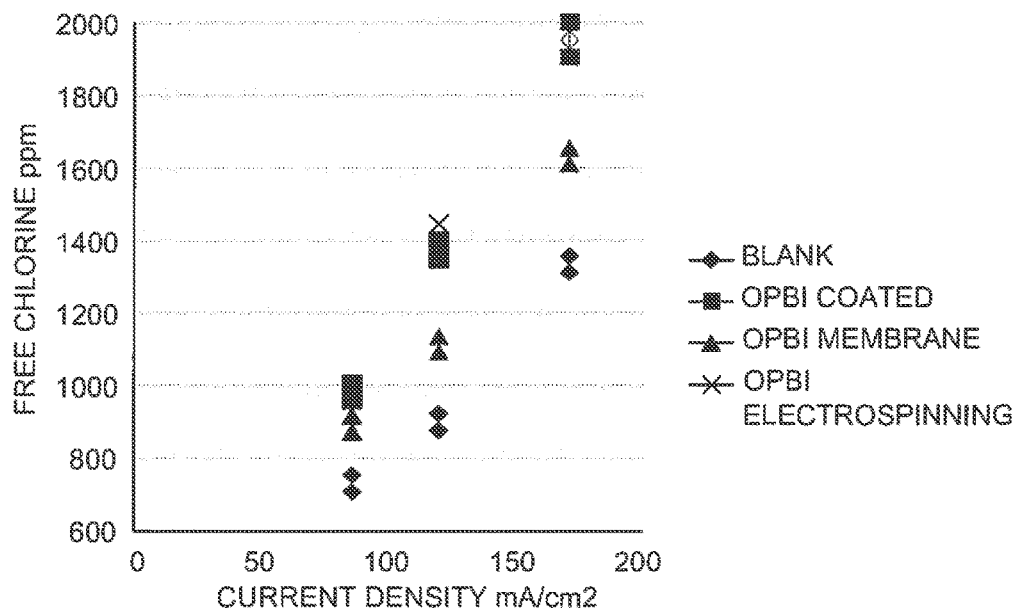
FIG. 8 shows the free chlorine production versus current density by electrode type.

FIG. 8 shows the free chlorine (ppm) production versus the current density (mA/cm²) by electrode type. As may be seen in FIG. 8, the OPBI coated cathode (Electrode A) and the OPBI-fiber coated cathode (Electrode C) produce more free chlorine at a given current density than the control and the OPBI-membrane coated cathode (Electrode B).

Figure 9:
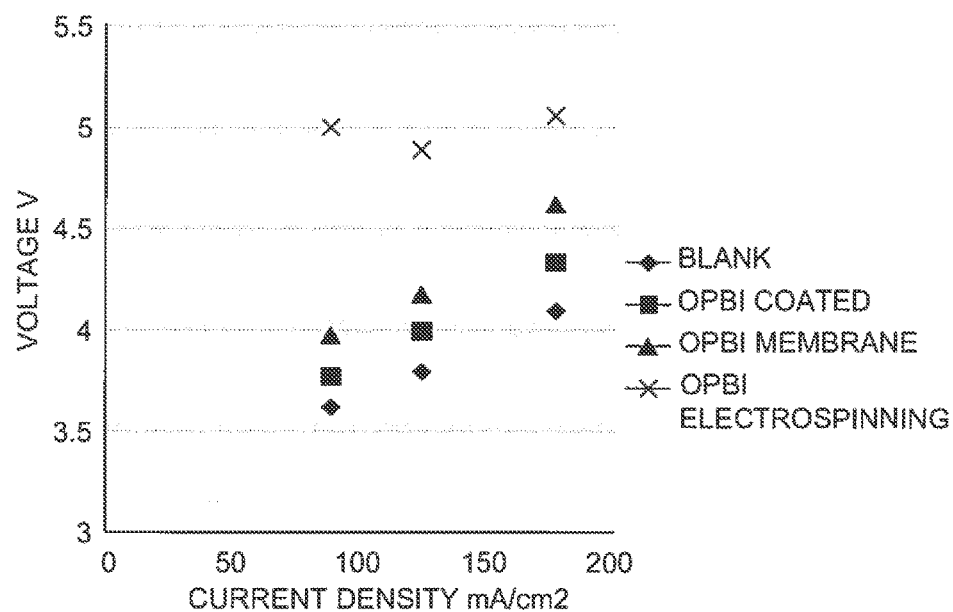
FIG. 9 shows the voltage versus the current density by electrode type.

FIG. 9 shows the voltage (V) versus the current density (mA/cm²) by electrode type. Of the coated electrodes, Electrode A (OPBI coated) has the lowest voltage and Electrode C (OPBI-fiber coated) has the highest voltage. Long-term testing, however, indicates that Electrode C may be more physically stable than Electrodes A and B. Therefore, the preferable coating type may depend on users' preferences or the requirements of a specific process or application.

Example 5—Physical Stability and Chlorine Productivity

For the physical stability and chlorine productivity tests, two sets of four OPBI coated electrodes of various pore sizes were made using a similar process used to make Electrode A. Two sets of four electrodes, with an average pore size of 100 μm, 200 μm, 300 μm, and 500 μm, respectively were tested.

The first set of electrodes were placed in a 30 g/L NaSO₄ aqueous solution to produce H₂ (and O₂). An electric current was application to the electrodes for about 13 hours. After 13 hours, the physical stability was visually observed. The polymer coating on the 100 μm electrode showed some delamination after 13 hours. There were small holes in the polymer coating on the 200 μm electrode after 13 hours. The 300 and 500 μm electrodes, however, remained physically stable after 13 hours.

The second set of electrodes were placed in a 30 g/L NaCl solution and an electric current was applied for 20 minutes and the free chlorine (ppm) was measured. The results are shown in Table 1 below.

TABLE 1

| Electrode | 100 μm | 200 μm | 300 μm | 500 μm |
|---|---|---|---|---|
| 20 min free chlorine (ppm) | 6,700 | 7,700 | 7,900 | 7,600 |

As may be seen in Table 1, electrodes, with an average pore size of 100 μm or greater produce significant amounts of free chlorine.

Accordingly, in one aspect, a water treatment system may comprise at least one electrolytic cell comprising at least one electrode and a power source for powering the electrode. The electrode may be a metal electrode comprising a coating of polymer comprising structural units of formula I

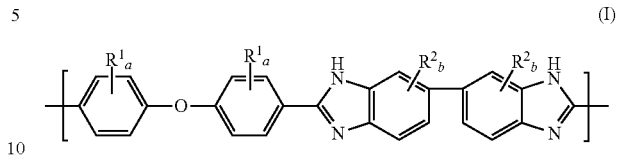

wherein $R^1$ is independently at each occurrence a $C_1$-$C_6$ alkyl radical or —$SO_3M$ wherein M is independently at each occurrence a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3. In one embodiment, b may be 0. In another embodiment, a may be 0. In yet another embodiment, both a and b may be 0. Alternatively, b may be 0, a may be 1, and $R^1$ may be —$SO_3H$.

M may be independently at each occurrence a hydrogen or an alkali metal. Suitable alkali metals include, but are not limited to hydrogen, lithium, sodium or potassium. In one embodiment, M may be sodium.

In another embodiment, the metal electrode may comprise a metal selected from the group consisting of titanium, nickel, aluminum, molybdenum, niobium, tin, tungsten, zinc, and combinations thereof. In one embodiment, the metal electrode may comprise titanium. In yet another embodiment, the metal electrode may be a metal plate or a metal foam electrode.

In another embodiment, the polymer coating may comprise fibers formed using an electrospinning process. In yet another embodiment, the metal electrode may be a foam metal electrode coated with a polymer coating comprising fibers formed using an electrospinning process.

In another embodiment, the electrolytic cell may comprise at least two electrodes and a liquid chamber between the at least two electrodes. The electrolytic cell may have an input line and/or an output line in communication with the liquid chamber.

In another aspect a method is provided. The method may comprise passing an electric current through an aqueous solution of an electrolyte by passing the electric current through an electrode of an electrolytic cell. The electrode may be a metal substrate with at least one surface comprising a coating of polymer comprising structural units of formula I

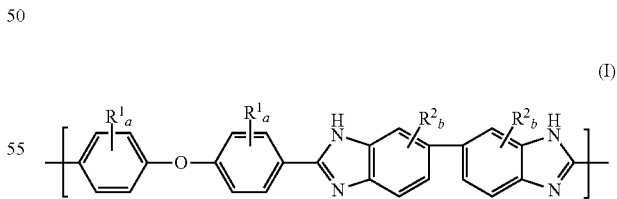

wherein $R^1$ is independently at each occurrence a $C_1$-$C_6$ alkyl radical or —$SO_3M$ wherein M is a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3.

At least some water from the aqueous solution is allowed to permeate, or be passively transported, through the coating to the metal substrate. The water may be reduced upon contacting the metal substrate to produce hydroxide ions. The hydroxide ions may be passively transported back through the coating away from the metal substrate and into proximity with cations of the aqueous solution to produce hypochlorite.

In one embodiment, the aqueous solution may be an alkali halide solution. In yet another embodiment, the aqueous solution may be a sodium chloride solution or a potassium chloride solution.

In another embodiment, the polymer coating may have the formula above wherein b is 0. In another embodiment, a may be 0. Alternatively, a may be 1 and $R^1$ may be $-SO_3H$ or $-SO_3M$. In another embodiment, b is 0, a is 1, and $R^1$ is $-SO_3H$ or $-SO_3M$. In yet another embodiment, b is 0, a is 1, and $R^1$ is $-SO_3Na$ In another embodiment, the polymer may comprise structural units of formula I comprising structural units of formula:

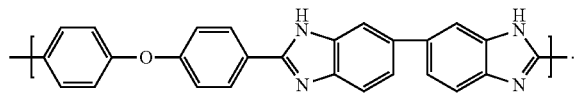

Alternatively, the polymer may comprise structural units of formula I comprising structural units of formula:

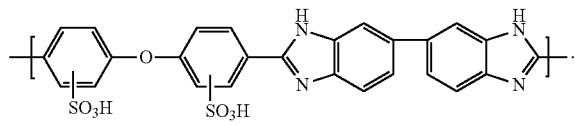

Alternatively, the polymer may comprise structural units of formula I comprising structural units of formula:

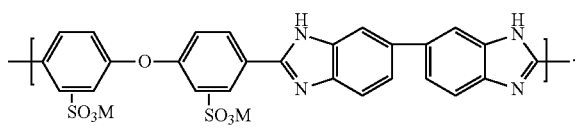

Alternatively, the polymer may comprise structural units of formula I comprising structural units of formula:

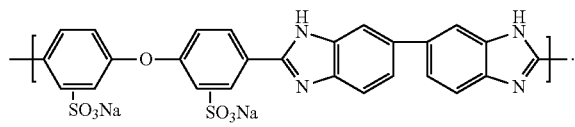

In another embodiment, the metal electrode may comprise a metal selected from the group consisting of titanium, nickel, aluminum, molybdenum, niobium, tin, tungsten, zinc, and combinations thereof. In another embodiment, the metal electrode may comprise titanium. In yet another embodiment, the metal electrode may be a metal plate or a metal foam electrode.

In another embodiment, the polymer coating may comprise fibers formed using an electrospinning process. In yet another embodiment, the metal electrode may be a foam metal electrode coated with a polymer coating comprising fibers formed using an electrospinning process.

The hypochlorite produced may be used to control or reduce the levels of microorganisms present in an aqueous stream. Accordingly, in another embodiment, the method may further comprise contacting an aqueous stream with the produced hypochlorite to reduce levels of microorganisms present in the aqueous stream.

While the disclosure has been illustrated and described in typical embodiments, it is not intended to be limited to the details shown, since various modifications and substitutions may be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A water treatment system comprising:
    at least one electrolytic cell comprising:
    at least one electrode;
    a power source for powering said electrode; and
    wherein said electrode is a metal electrode comprising a polymer coating, wherein the metal electrode is a metal plate or a metal foam electrode, and wherein the polymer coating comprises fibers formed using an electrospinning process, the polymer coating comprising structural units of formula I

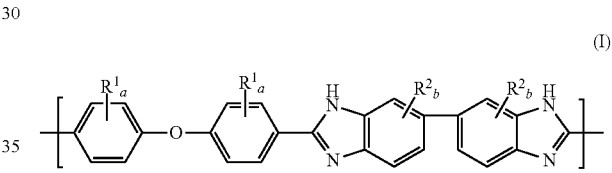

wherein $R^1$ is independently at each occurrence a $C_1$-$C_6$ alkyl radical or $-SO_3M$ wherein M is independently at each occurrence a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3.

2. The water treatment system of claim 1, wherein b=0.
3. The water treatment system of claim 2, wherein a=0.
4. The water treatment system of claim 2, wherein a=1 and $R^1$ is $SO_3M$ wherein M is a hydrogen or an alkali metal.
5. The water treatment system of claim 1, wherein the metal electrode comprises a metal selected from the group consisting of titanium, nickel, aluminum, molybdenum, niobium, tin, tungsten, zinc, and combinations thereof.
6. The water treatment system of claim 5, wherein the metal electrode comprises titanium.
7. The water treatment system of claim 1, wherein the metal electrode is a metal foam electrode.
8. The water treatment system of claim 1, wherein the electrolytic cell comprises at least two electrodes and a liquid chamber between the at least two electrodes and wherein at least one electrode is a bipolar electrode.
9. The water treatment system of claim 8, comprising an input line and/or an output line in communication with the liquid chamber.
10. A method, comprising:
    passing an electric current through an aqueous solution of an electrolyte by passing the electric current through an electrode of an electrolytic cell;

wherein, said electrode is a metal electrode with at least one surface comprising a polymer coating, wherein the metal electrode is a metal plate or a metal foam electrode, and wherein the polymer coating comprises fibers formed using an electrospinning process, the polymer coating comprising structural units of formula I

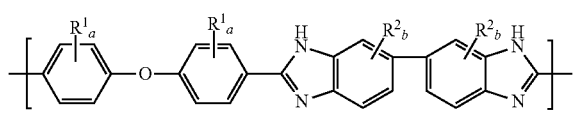
(I)

wherein $R^1$ is independently at each occurrence a $C_1$-$C_6$ alkyl radical or —$SO_3M$ wherein M is independently at each occurrence a hydrogen or an alkali metal, $R^2$ is independently at each occurrence a $C_1$-$C_6$ alkyl radical, a is independently at each occurrence an integer ranging from 0 to 4, and b is independently at each occurrence an integer ranging from 0 to 3;

transporting at least some water from the aqueous solution through said coating to said metal substrate and reducing said water to produce hydroxide ions; and transporting said hydroxide ions back through said coating away from said metal substrate and into the aqueous solution thereby contacting the cations in the aqueous solution to produce hypochlorite.

11. The method of claim 10, wherein the aqueous solution is an alkali halide solution.

12. The method of claim 10, wherein the aqueous solution is a sodium chloride solution or a potassium chloride solution.

13. The method of claim 10, wherein b=0.

14. The method of claim 13, wherein a=0.

15. The method of claim 13, wherein a=1 and $R^1$ is —$SO_3M$ wherein M is a hydrogen or an alkali metal.

16. The method of claim 10, wherein the polymer comprising structural units of formula I comprises structural units of formula:

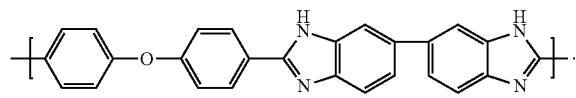

17. The method of claim 10, wherein the polymer comprising structural units of formula I comprises structural units of formula:

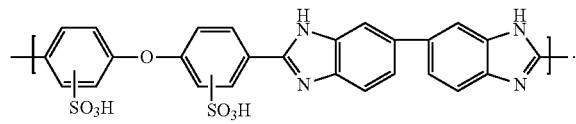

18. The method of claim 10, wherein the polymer comprising structural units of formula I comprises structural units of formula:

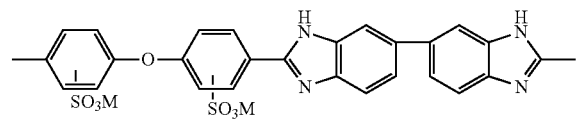

wherein M is independently at each occurrence a hydrogen or an alkali metal.

19. The method of claim 10, wherein the metal electrode comprises a metal selected from the group consisting of titanium, nickel, aluminum, molybdenum, niobium, tin, tungsten, zinc, and combinations thereof.

20. The method of claim 19, wherein the metal electrode comprises titanium.

21. The method of claim 10, wherein the metal electrode is a metal foam electrode.

22. The method of claim 10, further comprising contacting an aqueous stream with said produced hypochlorite to reduce levels of microorganisms present in said aqueous stream.

* * * * *